United States Patent [19]
Chiyomatsu

[11] Patent Number: 5,432,764
[45] Date of Patent: Jul. 11, 1995

[54] OFF-TRACK DETECTOR FOR DETECTING OFF-TRACK, AND OPTICAL INFORMATION RECORDING/REGENERATING APPARATUS

[75] Inventor: Nobumitsu Chiyomatsu, Hachioji, Japan

[73] Assignee: Olympus Optical Co., Ltd., Tokyo, Japan

[21] Appl. No.: 124,480

[22] Filed: Sep. 22, 1993

[30] Foreign Application Priority Data

Sep. 25, 1992 [JP] Japan ................... 4-256801

[51] Int. Cl.⁶ .............................................. G11B 7/00
[52] U.S. Cl. .................... 369/44.25; 369/44.29; 369/54; 360/77.04
[58] Field of Search ............ 369/44.32, 54, 58, 44.25, 369/44.29, 50, 44.13; 360/77.04, 73.03

[56] References Cited

U.S. PATENT DOCUMENTS

| | | | |
|---|---|---|---|
| 4,205,338 | 5/1980 | Schaefer | 360/77.04 X |
| 4,730,290 | 3/1988 | Takasago et al. | 369/44.25 X |
| 4,985,882 | 1/1991 | Tanaka et al. | 360/77.04 X |

*Primary Examiner*—Aristotelis Psitos
*Assistant Examiner*—Duncan Wilkinson
*Attorney, Agent, or Firm*—Armstrong, Westerman, Hattori, McLeland & Naughton

[57] ABSTRACT

The present invention includes a comparator that inputs a tracking error signal through one input terminal thereof, and a control circuit for producing a control signal that varies the reference level E of the comparator depending on an ROT signal which represents the rotational frequency of an optical disk. The control circuit varies the reference level E of the comparator depending on the rotational frequency of an optical disk. The comparator compares the varied reference level E with the tracking error signal, and outputs an off-track signal accordingly.

8 Claims, 4 Drawing Sheets

OFF-TRACK DETECTOR FOR DETECTING OFF-TRACK, AND OPTICAL INFORMATION RECORDING/REGENERATING APPARATUS

BACKGROUND OF THE INVENTION

1. Field of the Invention

The present invention relates to an off-track detector employed for an optical information recording-/regenerating apparatus, which records or regenerates information in or from an optical recording medium while controlling tracking by irradiating a light beam onto the optical recording medium, and the optical information recording/regenerating apparatus. More particularly, this invention is concerned with an off-track detector, which when off-track occurs during recording or regeneration, detects the off-track, and an optical information recording/regenerating apparatus.

2. Description of the Related Art

In recent years, various proposals have been made for an optical information recording/regenerating apparatus (hereinafter, optical disk unit) in which a light beam is converged and irradiated to an optical information recording medium (hereinafter, optical disk) to form a pit array or the like on the optical disk and thus record information optically, or light returned from a recorded pit array is received to regenerate recorded information.

In the foregoing optical disk unit, numerous tracks in which information is recorded are laid out on the optical disk so that information can be recorded with high density. For recording or regenerating information, tracking servo control is performed in which a tracking error signal is detected in the light reflected from or transmitted by the optical disk, and then a light beam is locked on to a track.

In a conventional optical disk unit in which the foregoing tracking error signal is used to determine whether a displacement of a light beam from a track on an optical disk exceeds a specified value. If the displacement exceeds the specified value, off-track is identified and off-track processing is performed. In the off-track processing, supposing data were being recorded on an optical disk, modulation would be stopped to decrease the light-emitting level to the level for regeneration and eventually prevent destruction of the optical disk. The optical disk would then be replaced with a new one if necessary. Supposing data were being regenerated, retry would be executed: a regenerative beam is returned to a regeneration start point, and regeneration is resumed with tracking controlled. As for off-track detection, a proposal has been made for an apparatus that will not be very responsive to a flaw on an optical disk. For example, an apparatus disclosed in Japanese Patent Laid-Open No. 63-7522 does not identify off-track when an output duration of a signal representing an off-track state is a specified time.

For an optical disk unit, various proposals have been made in recent years. Herein, the rotational frequency of an optical disk is made higher by shortening a recording time and raising a transfer rate. This kind of optical disk unit includes two recording/regenerating facilities: one facility permits information recording or regeneration at the conventional rotational frequency so as to provide compatibility with conventional optical disks, and the other facility permits information recording or regeneration at a rotational frequency that is, for example, twice the conventional rotational frequency. A servo system for this optical disk unit is designed to have a frequency characteristic compatible with an optical disk that is rotated at a relatively low rotational frequency of 1800 rpm.

In the conventional optical disk having two recording/regenerating facilities for recording or regenerating information at the conventional rotational frequency and the rotational frequency that is twice the conventional one. If an optical disk has a defect, a tracking error signal becomes larger in voltage value. One of the reasons is that when the rotational frequency is, for example, doubled, the eccentric acceleration in a radial direction is squared. The other reason is that as mentioned above, the servo system is designed to comply with an optical disk that is rotated at a relatively low rotational frequency. This servo system permits unsatisfactory tracking, which increases a residual of a light beam from a track on the optical disk. Consequently, the tracking error signal becomes larger in voltage value.

In a prior art method of determining occurrence for off-track by comparing a tracking error signal with a specified value, although a defect of an optical disk is recognized as a value smaller than a value specified in a comparator when the optical disk is rotated at a relatively low rotational frequency, the defect is detected as a value exceeding the value specified in the comparator when the optical disk is rotated at a rotational frequency that is twice the relatively low rotational frequency. Consequently, off-track is detected incorrectly. This incorrect detection brings about a problem that retry is repeated or a transfer rate decreases.

SUMMARY OF THE INVENTION

An object of the present invention is to provide an off-track detector in which when the magnitude of fluctuation in a tracking error signal resulting from a defect in an optical recording medium varies depending on the rotational frequency of the optical recording medium, detection of an off-track state can be reliably accomplished using a simple configuration.

Another object of the present invention is to provide an optical information recording/regenerating apparatus in which when provided with the off-track detector, detection of an off-track state can be reliably accomplished using a simple configuration while offering improved recording efficiency and information transfer efficiency.

An off-track detector according to the present invention comprises a rotational frequency setting means for specifying the rotational frequency of a disk-like rotary optical recording medium, a determination reference setting means for specifying a determination reference on the basis of the rotational frequency set by the rotational frequency setting means, and an off-track detecting means that detects an off-track state by comparing a tracking error signal, which is produced according to the returned light of a light beam irradiated to a track on the optical recording medium, and represents a displacement of the light beam from the track, with the determination reference. A light beam is irradiated onto the optical recording medium which rotates at a rotational frequency set by the rotational frequency setting means. The off-track detecting means detects an off-track state by comparing the tracking error signal with the determination reference.

An optical information recording/regenerating apparatus of the present invention comprises an off-track detector having the foregoing components, a rotative means for rotating a disk-like optical recording medium, an irradiating means for irradiating a light beam onto the optical recording medium, and a displacement detecting means that detects a displacement of the optical recording medium from a track in the light returned from the optical recording medium, and produces a tracking error signal accordingly.

Other features and advantages of the present invention will be fully apparent from the description below.

BRIEF DESCRIPTION OF THE DRAWINGS

FIGS. 1 to 4 relate to the first embodiment of the present invention;

FIG. 1 is a block diagram showing a conceptual configuration of a major portion of an optical information recording/regenerating apparatus;

FIG. 2 is a block diagram showing a configuration of the major portion of the optical information recording/regenerating apparatus;

FIG. 3 is a block diagram showing a configuration of a window comparator;

FIG. 5 is a block diagram showing a configuration of a window comparator;

FIG. 6 is a block diagram showing a configuration of a mask circuit; and

FIG. 7 is a timing chart showing the operation of the mask circuit.

DETAILED DESCRIPTION OF THE PREFERRED EMBODIMENTS

Figure 1:
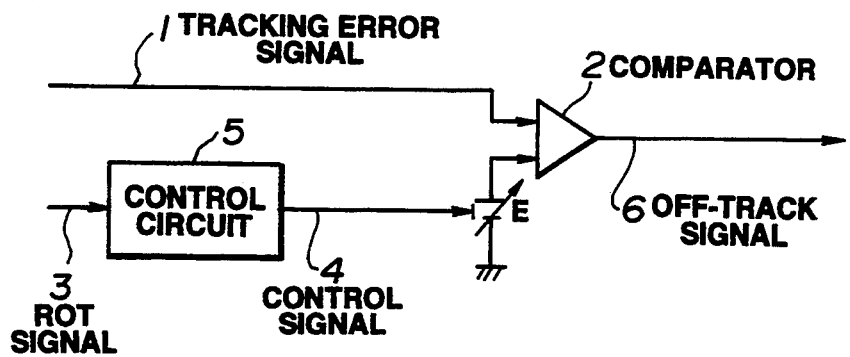

Referring to the drawings, embodiments of the present invention will be described below.

An optical information recording/regenerating apparatus of the first embodiment differs from a conventional one in a point that information is recorded or regenerated by rotating an optical disk at multiple different rotational frequencies, and that when information is recorded or regenerated on or from an optical disk that rotates at a different rotational frequency, off-track or an off-track state is always detected in a tracking error signal under a constant condition.

To be more specified, the optical information recording/regenerating apparatus of this embodiment includes, as shown in FIG. 1, a comparator 2 that inputs a tracking error signal 1 through one input terminal thereof, and a control circuit 5 for producing a control signal 4 that varies a reference level E of the comparator 2 depending on an ROT signal 3 or a signal representing the rotational frequency of an optical disk. The control circuit 5 varies the reference level E of the comparator 2 depending on the rotational frequency of an optical disk. The comparator 2 compares the varied reference level E with the tracking error signal 1, and outputs an off-track signal 6 accordingly. The other components such as a tracking servo system, a focusing servo system, an information recording system, and an information regenerating system may be formed with known means.

A servo system in this embodiment is designed to have a frequency characteristic compatible with a conventional optical disk that is rotated at a relatively low rotational frequency of, for example, 1800 rpm. The optical information recording/regenerating apparatus of this embodiment can perform information recording or regeneration for an optical disk that is rotated at either of different rotational frequencies of, for example, 1800 rpm and 3600 rpm.

Figure 2:
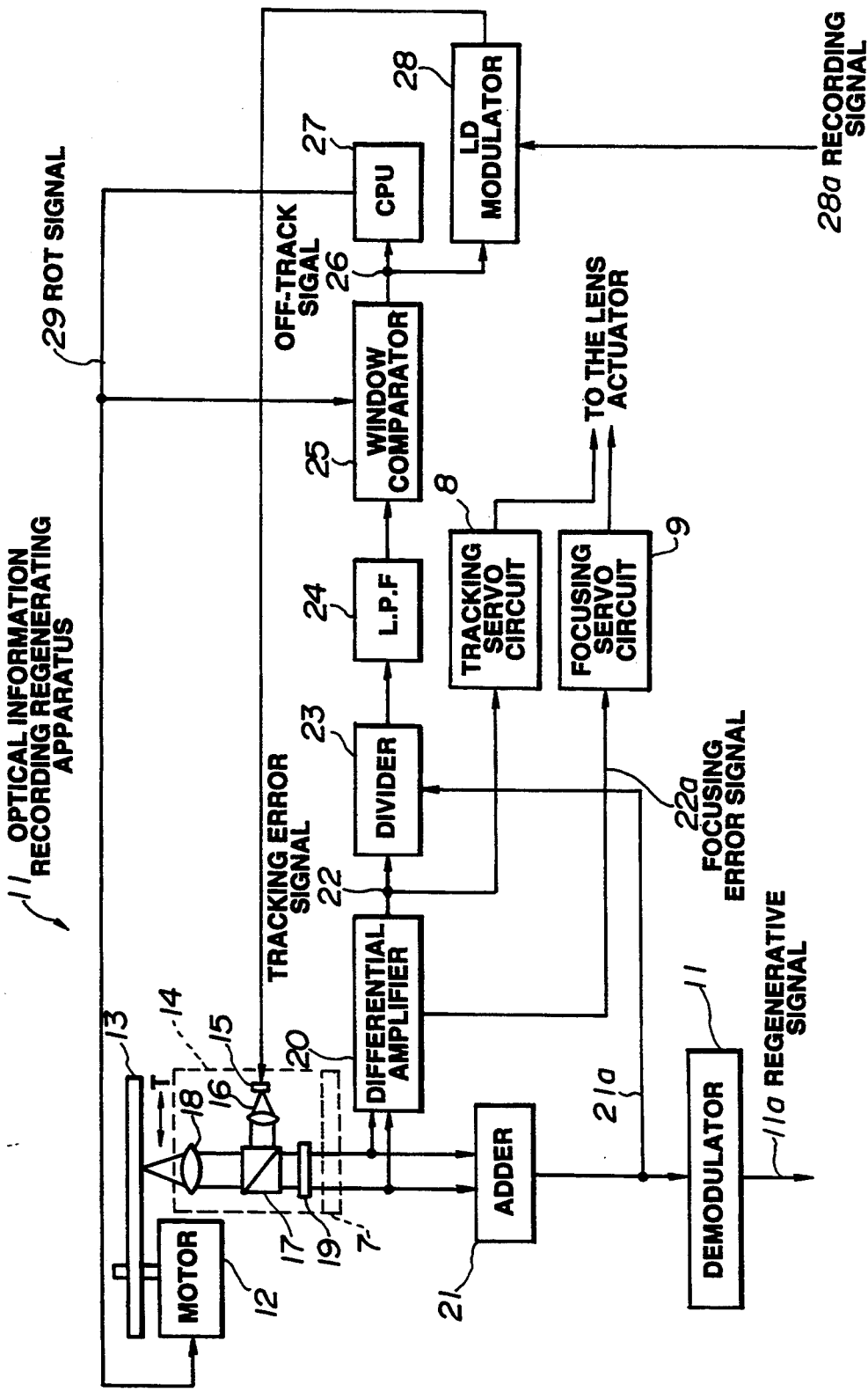

The configuration of an optical information recording/regenerating apparatus 1 will be described in detail. As shown in FIG. 2, an optical pickup 14 is located on the opposite side of an optical disk 13 that is driven to rotate by a spindle motor 12. The optical pickup 14 is movable in the radial direction of the optical disk 13; that is, in the direction T transversing concentric or spiral tracks owing to a voice coil motor.

A laser diode (hereinafter, LD) 15 serving as a light beam generating means is incorporated in the optical pickup 14. A light beam generated by the LD 15 is recomposed by a collimator lens 16 and becomes light of parallel rays. The light of parallel rays is then reflected from a beam splitter 17, converged by an objective lens 18, and irradiated as beam spots on the optical disk 13. The objective lens 18 can be moved in either the direction transversing the tracks on the optical disk 13 or the direction perpendicular to the surface of the optical disk 13 by means of a lens actuator which is not shown. For recording, the LD 15 irradiates a light beam of a specified level according to an LD modulator 28, forms pits on the recording surface of the optical disk 13, and records information based on a recording signal 28a. For regeneration, the LD 15 irradiates a light beam of a specified level, which is lower than the one for recording, according to the LD demodulator 28, and regenerates information from the recording surface using reflected light.

Light returned from the optical disk 13 is transmitted by the objective lens 18 and beam splitter 17, and then irradiated on a photodetector 19 having, for example, a two-division structure. The photodetector 19 is oriented so that the dividing line will be aligned with any of the tracks on the photodetector 19. Two signals sent from the photodetector 19 are fed to each of a differential amplifier 20 and an adder 21. The differential amplifier 20 produces a tracking error signal 22, which will be described later, representing a displacement of a light beam from a track on the optical disk 13 or a focusing error signal 22a depending on a difference between the above two input signals. The adder 21 produces an addition signal 21a representing a sum of the two input signals. The tracking error signal 22 sent from the differential amplifier 20 and the addition signal 21a are supplied to a divider 23. By the way, either a push-pull method or three-beam method may be employed for detection of the tracking error signal.

The tracking error signal 22 is supplied to a tracking servo circuit 8, while the focusing error signal 22a is supplied to a focusing servo circuit 9. The tracking servo circuit 8 and focusing servo circuit 9 drive the lens actuator, which is not shown, for driving the objective lens 18, whereby tracking and focusing are controlled. The addition signal 21a is supplied to a demodulator 11. The demodulator 11 regenerates information in the form of a regenerative signal 11a.

The divider 23 outputs a signal whose voltage value corresponds to a quotient resulting from the division of the voltage value of the tracking error signal 22 provided by the differential amplifier 20 by that of the output signal of the adder 21. The output signal of the divider 23 is unaffected by the quantity of light in a light beam, a variation in reflectance of the optical disk 2, a variation in sensitivity of the photodetector 9, and so on. Constant output is always supplied with respect to unit off-track. In an apparatus dedicated to regeneration, the divider 23 and adder 21 can be excluded.

The output signal of the divider 23 is fed to a low-pass filter (L.P.F.) 24 for cutting out noise of high frequencies. The output of the low-pass filter 24 is fed to a window comparator 25. When an input signal exceeds a comparator level, the window comparator 25 outputs an off-track signal 26. The off-track signal 26 is fed to each of a CPU 27 and an LD modulator 28. Supposing data were being recorded on the optical disk 3, the LD modulator 28 would stop modulation, and decrease the light-emitting level to the one for regeneration in order to prevent destruction of the optical disk. If data regeneration were in progress, the CPU 27 would execute retry for regeneration. Specifically, the CPU 27 returns a regenerative beam to a regeneration start point, and resumes regeneration while controlling tracking.

The CPU 27 outputs an ROT signal 29, which is a rotational frequency setting signal for specifying the rotational frequency of the optical disk 3, to each of the spindle motor 12 and window comparator 25. The spindle motor 12 drives and rotates the optical disk 3 at the rotational frequency specified in the ROT signal 29.

Figure 3:
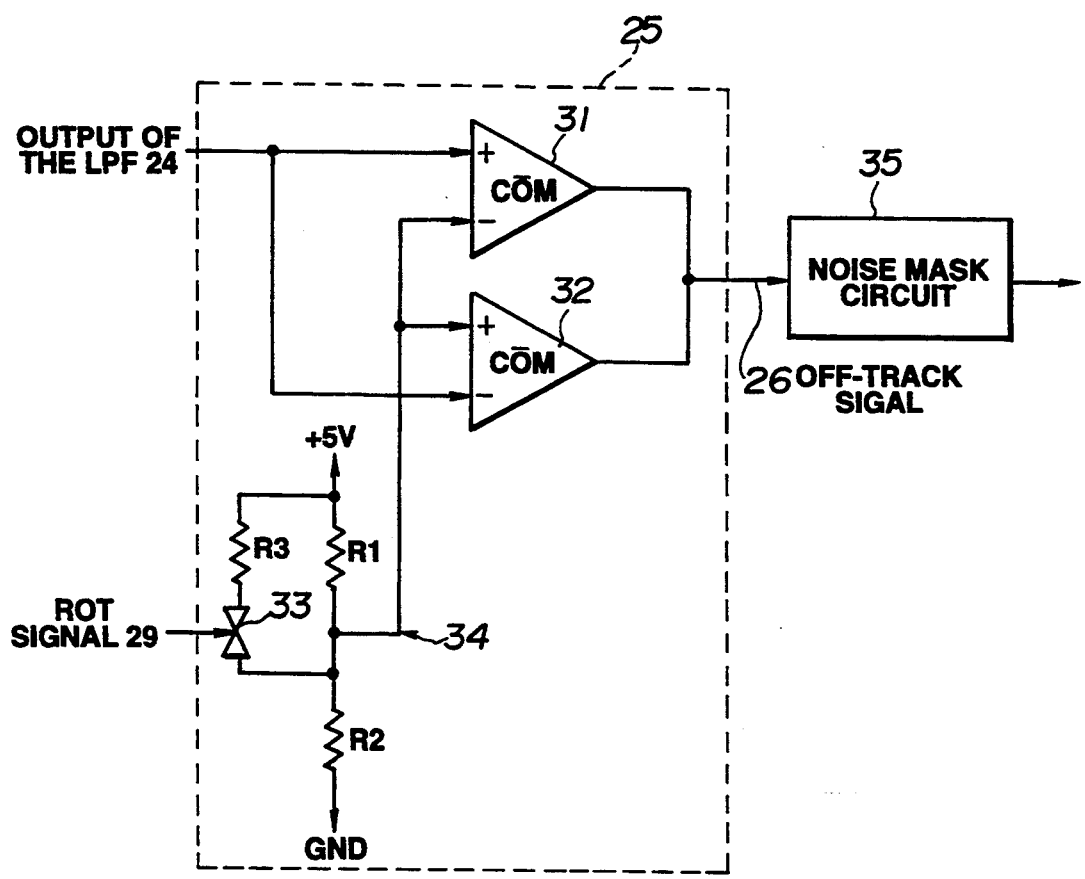

The window comparator 25 comprises, as shown in FIG. 3, a comparator 31 that inputs the output of the low-pass filter 24 through the plus input terminal thereof, a comparator 32 that inputs the output of the low-pass filter 24 through the minus input terminal thereof, and a reference voltage setting circuit 34 for setting a reference voltage in the other input terminals of the comparators 31 and 32. In the reference voltage setting circuit 34, resistors R1 and R2 are connected in series with each other. When a switch 33 is turned on, the resistor R1 is connected in parallel with a resistor R3. The switch 33 is controlled with the ROT signal 29. The reference voltage is a potential between the resistor R2 and ground. That is to say, when the rotational frequency is normal, for example, 1800 rpm, the switch 33 is turned off with the ROT signal, and the reference voltage is set to a first level V1 that is determined with a ratio of the fraction of, for example, 5 V tapped by R1 to the fraction thereof tapped by R2. When the rotational frequency is 3600 rpm, the switch 33 is turned on with the ROT signal. The reference voltage is set to a second level V2 determined by a ratio of the fraction tapped by a synthetic resistance R' of R1 and R3 (R'=R1·R3/(R1+R3)) to the fraction tapped by R2.

A noise mask circuit 35 is installed so that the off-track signal 26 provided by the window comparator 25 will be validated only when it remains active for more than a specified period of time, whereby the off-track signal 26 will not be supplied incorrectly. If any other measure were taken against noise, the noise mask circuit 35 might be excluded.

The operation of this embodiment having the aforesaid components will be described in conjunction with FIGS. 4(a) and 4(b)

Figure 4A:
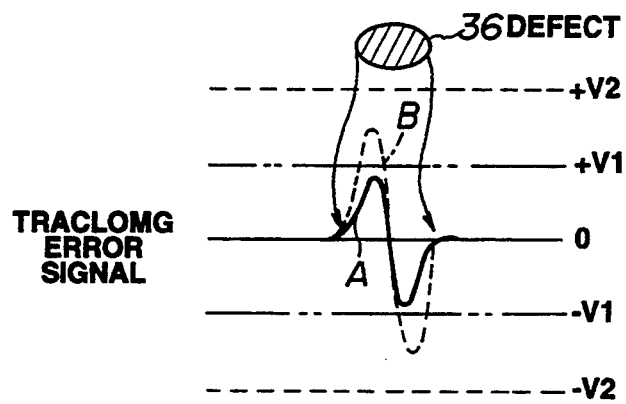
FIGS. 4(a) and 4(b) are explanatory diagram showing the operation of the major portion of the optical information recording/regenerating apparatus.
Figure 4B:
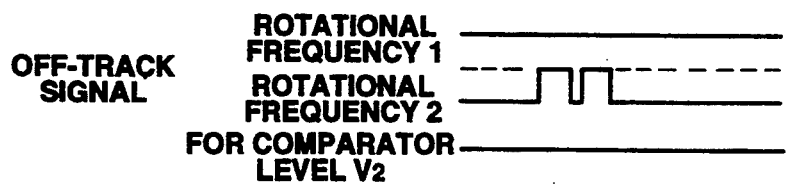

When the rotational frequency of the optical disk 3 is normal, for example, 1800 rpm (rotational frequency 1), even if a track has a defect 36, since the tracking servo can demonstrate the lock-on capability satisfactorily due to the frequency characteristic of a servo system, the magnitude of fluctuation in the tracking error signal, as indicated with a solid line A in FIG. 4a, will not exceed the first level V1 (reference voltage). The off-track signal is therefore not output (for the rotational frequency 1 in FIG. 4b). When the rotational frequency of the optical disk 3 is 3600 rpm (rotational frequency 2) that is twice the above rotational frequency, the increase in eccentric acceleration disables the tracking servo from locking on to a track having the defect 36. The tracking error signal therefore fluctuates to exceed the first level V1 indicated with a dashed line B. When the reference voltage is the first level V1, the off-track signal is output (for the rotational frequency 2 in FIG. 4b). However, since the switch 33 is turned on with the ROT signal and the comparator level is set to the second level V2, although the tracking error signal fluctuates to exceed the first level V1 as indicated with the dashed line B, the tracking error signal will not exceed the second level V2 (reference voltage). The off-track signal is therefore not output (for the comparator level V2 in FIG. 4b).

As mentioned above, according to this embodiment, when the magnitude of fluctuation in the tracking error signal resulting from the same defect varies due to the change in the rotational frequency, the off-track signal is detected relative to a varied comparator level. An off-track state will therefore not be detected incorrectly. This eliminates the drawback resulting from incorrect detection of an off-track state that the number of replaced sectors caused by replacement increases to decrease a storage capacity during recording, or that the number of retries increases to deteriorate a transfer rate during regeneration. Despite the simple configuration, recording or regeneration can be achieved efficiently.

The previous description is based on the assumption that the rotational frequency of an optical disk is 1800 or 3600 rpm. The present invention can, needless to say, apply to any rotational frequencies different from the above ones as long as the reference voltage is set to another values. In the aforesaid embodiment, two rotational frequencies are employed. The present invention can apply to an optical information recording-/regenerating apparatus capable of recording or regenerating information at three or more rotational frequencies as long as the reference voltage is set to multiple values.

Next, the second embodiment will be described.

The second embodiment is substantially identical to the first embodiment. The only differences are the configuration of a window comparator and the presence of an off-track signal producing means. The different components alone will be described.

Figure 5:
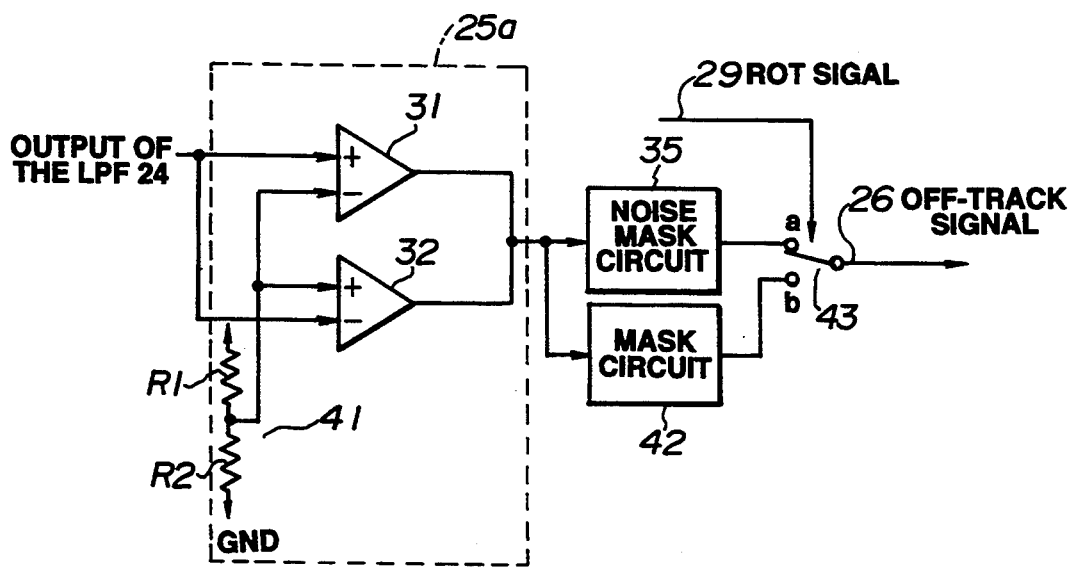
FIGS. 5 to 7 relate to the second embodiment of the present invention.

As shown in FIG. 5, a window comparator 25a in the second embodiment, which inputs the output of the low-pass filter 24 in FIG. 2, comprises, similarly to the one in the first embodiment, the comparator 31 that inputs the output of the low-pass filter 24 through the plus input terminal thereof, the comparator 32 that inputs the output of the low-pass filter 24 through the minus input terminal thereof, and a reference voltage setting circuit 41 for setting a reference voltage in the other input terminals of the comparators 31 and 32. In the reference voltage setting circuit 41, the registers R1 and R2 are connected in series with each other. The reference voltage is a potential V between the resistor R2 and ground.

The output of the window comparator 25a is fed to each of the noise mask circuit 35 which has been described in the first embodiment, and a mask circuit 42 which will be described later. When the ROT signal 29 is applied to change the state of a switch 43, either the output of the noise mask circuit 35 or that of the mask circuit 42 is selected to detect the off-track signal 26. When the ROT signal 29 represents, for example, 1800 rpm, the switch 43 is set to an a terminal. When the ROT signal 29 represents 3600 rpm, the switch 43 is set to a b terminal.

Figure 6:
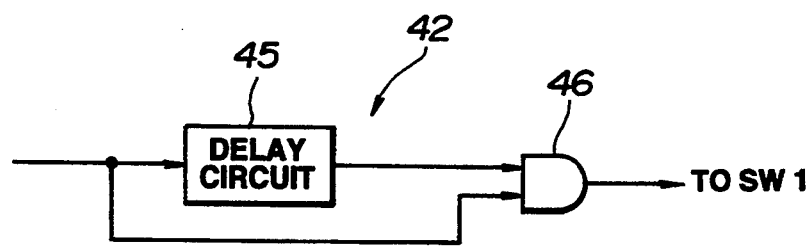
Figure 7A:
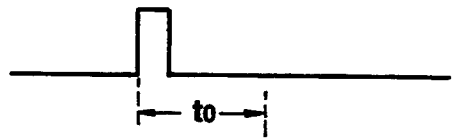
Figure 7B:
Figure 7C:
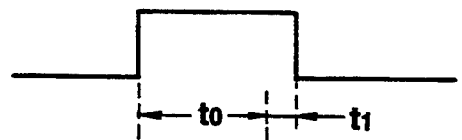
Figure 7D:

The mask circuit 42 comprises, as shown in FIG. 6, a delay circuit 45 for delaying the output of the window comparator 25a by a specified delay time t0, and an AND circuit 46 for providing the AND (logical product) of the outputs of the delay circuit 45 and window comparator 25a. When the pulse duration of the output of the window comparator 25a is, as shown in FIG. 7a, shorter than the delay time t0, the output of the delay circuit 45 delayed by the time t0 shows the wave in FIG. 7b. The outputs of the window comparator 25a and delay circuit 45 are not phased each other. The AND circuit therefore outputs a low-level signal. When the pulse duration of the output of the window comparator 25a is, as shown in FIG. 7c, longer by t1 than the delay time t0 (t0+t1), the output of the delay circuit 45 delayed by the time t0 shows the wave in FIG. 7d. The outputs of the window comparator 25a and delay circuit 45 are phased each other only for the time t1. The AND circuit 46 outputs a high-level signal for the time t1.

In the second embodiment, when the rotational frequency of the optical disk 3 is normal, for example, 1800 rpm, even if a track has a defect, since the tracking servo can demonstrate the lock-on capability satisfactorily due to the frequency characteristic of the servo system, the magnitude of fluctuation in the tracking error signal will not exceed a level V (reference voltage). The off-track signal will not be output.

When the rotational frequency of the optical disk 3 is 3600 rpm that is twice the normal rotational frequency, the eccentric acceleration increases. The tracking servo cannot exhibit the lock-on capability satisfactorily for a track having a defect. The tracking error signal therefore fluctuates to exceed the level V. When the magnitude of fluctuation is large, the time during which the level V is exceeded becomes longer. When the mask circuit 42 identifies the long time, the off-track signal is output. Specifically, when the rotational frequency is 3600 rpm that is twice the normal rotational frequency, the ROT signal causes the switch 42 to make the terminal b. The output of the mask circuit 42 is now to be provided as the off-track signal. Based on the result of comparing the time, during which the level V is exceeded and which increases in proportion to the magnitude of fluctuation in the tracking error signal, with the delay time t0, the AND circuit 46 outputs the off-track signal.

To be more specific, assuming that a track has a defect which does not cause the off-track signal to output at the normal rotational frequency of 1800 rpm, when the rotational frequency is doubled or changed to 3600 rpm, as described above, the tracking error signal fluctuates to exceed the level V. The magnitude of the fluctuation is, however, smaller than that in an actual off-track state. The outputs of the window comparator 25a and delay circuit is therefore not phased each other. The off-track signal is therefore not output. However, when the tracking servo enters the off-track state, the magnitude of fluctuation in the tracking error signal increases. The time during which the level V is exceeded becomes longer accordingly. Based on the result of comparing the time during which the level V is exceeded with the delay time t0, the AND circuit 46 outputs the off-track signal.

As mentioned above, according to this embodiment, even if the magnitude of fluctuation in the tracking error signal resulting from the same defect varies because of the change in the rotational frequency, since an off-track signal is detected by measuring the time during which a comparator level is exceeded, an off-track state will not be detected incorrectly. This eliminates a drawback resulting-from incorrect detection of an off-track state; such as, the number of replaced sectors caused by replacement increases to decrease a storage capacity during recording or the number of retries increases to deteriorate a transfer rate during regeneration. Despite the simple configuration, recording or regeneration can be achieved efficiently.

Similarly to the first embodiment, the second embodiment has been described on the assumption that the rotational frequency of an optical disk is 1800 or 3600 rpm. Needless to say, the present invention can apply to the other different rotational frequencies as long as the reference voltage and delay time are set to another appropriate values. The aforesaid embodiment handles two rotational frequencies. The present invention can also apply to an optical information recording-/regenerating apparatus in which multiple delay circuits are installed and switched to enable recording or regenerating information at three or more different rotational frequencies.

In each of the aforesaid embodiments, an optical disk may be a write-once optical disk, a phase-change optical disk, or a magneto-optic disk. An optical disk containing unrewritable information will also do.

In the present invention, it will be apparent that a wide range of different working modes can be formed on the basis of the invention without departing from the spirit and scope of the invention. This invention is limited to the appended claims but not restricted to any specific working modes.

What is claimed is:

1. An off-track detector, comprising:
   a rotational frequency setting means for specifying the rotational frequency of a rotary disk-like optical recording medium;
   a determination reference voltage value setting means for specifying a determination reference voltage value on the basis of said rotational frequency specified by said rotational frequency setting means; and
   an off-track detecting means for detecting an off-track state by comparing a track error signal representing a displacement of a light beam irradiated to a track on said optical recording medium from said track, which is produced according to the returned light of said light beam, with said determination reference,
   wherein said determination reference voltage value is increased by a predetermined amount at higher rotational frequencies of said optical recording medium.

2. An off-track detector according to claim 1, wherein said off-track detecting means includes a comparator for comparing said tracking error signal with said determination reference.

3. An off-track detector according to claim 1, wherein said determination reference specified by said determination reference setting means includes a plurality of determination reference voltages based on rotational frequencies which are to be compared with the output voltage of said tracking error signal.

4. An off-track detector according to claim 3, wherein said determination reference setting means taps a specified potential to specify said plurality of determination reference voltages.

5. An off-track detector according to claim 1, wherein said determination reference specified by said determination reference setting means is a determination reference voltage based on a rotational frequency which is to be compared with the output voltage of said tracking error signal, and said off-track detecting means detects said off-track state depending on the time during which the output voltage of said tracking error signal exceeds said determination reference voltage.

6. An off-track detector according to claim 5, wherein said off-track detecting means comprises a comparing means for comparing the output potential of said tracking error signal with said determination reference voltage, a delay means for delaying the output of said comparing means by a specified time, and a calculating means for calculating a time, during which said output voltage of said tracking error signal exceeds said determination reference voltage, using the outputs of said comparing means and said delay means.

7. An off-track detector according to claim 6, wherein said calculating means is an arithmetic logic means for providing the AND (logical product) of the outputs of said comparing means and said delay means.

8. An optical information recording/regenerating apparatus having an off-track detector recited in claim 1, comprising:

a rotating means for rotating a disk-like optical recording medium;

an irradiating means for irradiating a light beam to said optical recording medium; and a displacement detecting means that detects a displacement of said optical recording medium from a track in the light returned from said optical recording medium, and produces a tracking error signal.

* * * * *